Oct. 26, 1926.
A. J. PAULY
1,604,479
TOOL FOR DRIVING WOODEN AUTOMOBILE WHEELS ON AXLES
Filed April 13, 1925
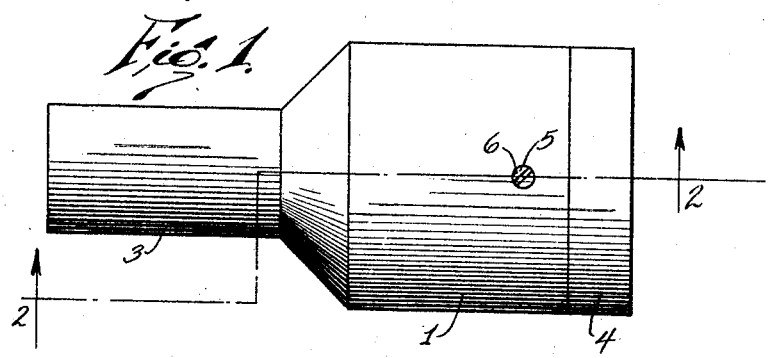
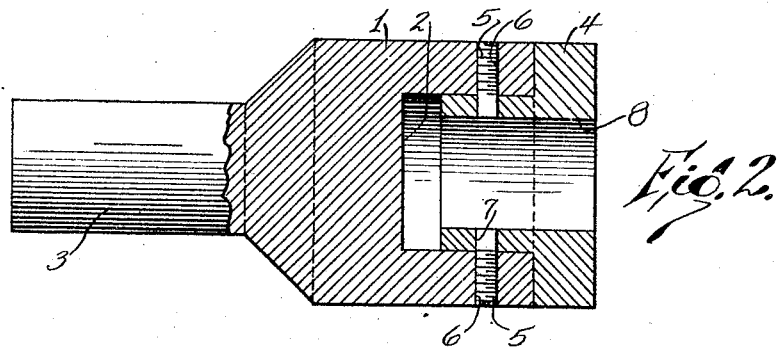
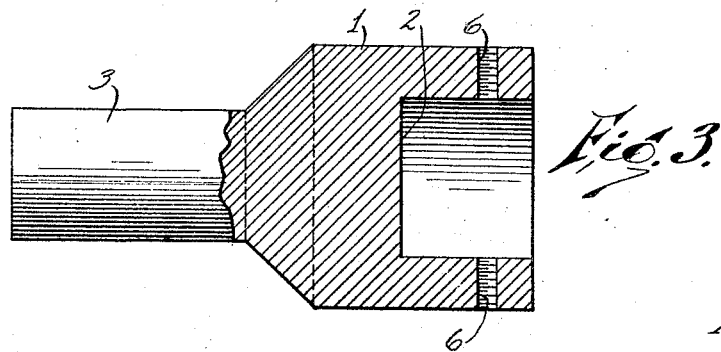
INVENTOR
A. J. PAULY
BY
ATTORNEYS Patented Oct. 26, 1926.

1,604,479

UNITED STATES PATENT OFFICE.

ARTHUR JOHN PAULY, OF NAVASOTA, TEXAS.

TOOL FOR DRIVING WOODEN AUTOMOBILE WHEELS ON AXLES.

Application filed April 13, 1925. Serial No. 22,838.

My invention relates to improvements in tools for driving wooden automobile wheels on hubs, and it consists in the combinations, constructions, and arrangements herein described and claimed.

An object of my invention is to provide a tool for driving automobile wheels on axles which is constructed of a single piece and is adapted to uniformly contact with the entire hub of the wheel, whereby the wheel will be uniformly driven into place by the tool.

A further object of my invention is to provide a tool of the type described which is extremely compact in construction, and which is provided with means for permitting the same tool to be used in forcing various types of wheels on the axles of the automobiles.

Other objects and advantages will appear in the following specification, and the novel features of the invention will be particularly pointed out in the appended claims.

My invention is illustrated in the accompanying drawing forming part of this application, in which—

Figure 1 is a side elevation of the device,

Figure 2 is a section along the line 2—2 of Figure 1, and

Figure 3 is a similar section with the reducing bushing removed.

In carrying out my invention I provide a tool in which the body portion is provided with a large end 1 having a recess 2 therein. The opposite end of the body portion is reduced as at 3, and is preferably solid, so as to provide a striking head for the tool. The recess 2 is circular in shape, and is of such a size as to receive the hub (not shown) of an automobile wheel. In case the hub of the wheel is smaller in diameter than the diameter of the recess 2 I dispose a reducing bushing 4 in the recess 2 and lock the same in place by means of set screws 5 (see Figure 2) and these set screws are received in threaded bores 6 in the body portion 1 and in openings 7 in the bushing 4. The bushing 4 has a bore 8 of a size large enough to snugly receive the hub of the wheel. It is obvious that I may provide as many bushings as desired, each of these bushings having bores 8 of different diameters so as to adapt the bushing to the particular hub of the wheel desired to be forced into place.

From the foregoing description of the various parts of the device the operation thereof may be readily understood. The tool is to be provided as one of the tools in the standard equipment of cars. Garages and the like may also use the tool, and in this case the garage will also have a number of bushings 4, whereby one tool may be used for the various kinds of work. Figure 3 shows the tool without the bushing 4 being secured in place. This tool is used when the hub of the wheel is of such a diameter as to be snugly received in the recess 2.

In use the wheel (not shown) is placed upon the axle of the car and then the tool is placed upon the hub. The mechanic now takes a hammer or other like implement and drives the hub onto the axle by striking the member 3. The force of the blows is equally transmitted to all parts of the wheel, and therefore the wheel is evenly driven into place on the axle. In case the hub of the wheel is of a smaller diameter than the diameter of the recess 2, a reducing bushing 4 having a bore 8 of the same diameter as the diameter of the hub is disposed within the recess 2 and is locked in place by means of set screws 5. The tool is now used in the same manner as heretofore described.

I claim:—

1. A tool of the type described comprising a body portion having a relatively large circular recess therein, a striking head integral with said body portion, a reducing bushing, an annular flange integral with said bushing and receivable in the recess, and means for rigidly securing said flange and said bushing in place.

2. A tool of the type described comprising a body portion having a relatively large circular recess and relatively small threaded openings therein, a striking head integral with said body portion, a reducing bushing, an annular flange having openings therein integral with said bushing and receivable in the recess, and screws disposed in the threaded openings in said body portion and adapted to enter the openings in said flange for locking said flange in place.

3. A tool of the type described comprising a body portion having a relatively large circular recess and relatively small threaded openings therein, a striking head integral with said body portion, a reducing bushing, an annular flange having openings therein integral with said bushing and receivable in the recess, and screws disposed in the threaded openings in said body portion and adapted to enter the openings in said flange for locking said flange in place, said bushing being adapted to engage with the hub of a wheel, said tool being adapted to move the wheel onto an axle of the vehicle when said head is struck with an instrument.

ARTHUR JOHN PAULY.